(12) United States Patent
Heckmeier et al.

(10) Patent No.: US 7,777,930 B2
(45) Date of Patent: Aug. 17, 2010

(54) ELECTRO-OPTICAL LIGHT CONTROL ELEMENT AND DISPLAY HAVING A CONTROL MEDIUM WITH AN OPTICALLY ISOTROPIC PHASE

(75) Inventors: Michael Heckmeier, Hemsbach (DE); Markus Czanta, Mainz (DE); Achim Goetz, Alsbach-Hähnlein (DE)

(73) Assignee: Merck Patent GmbH, Darmstadt (DE)

( * ) Notice: Subject to any disclaimer, the term of this patent is extended or adjusted under 35 U.S.C. 154(b) by 858 days.

(21) Appl. No.: 10/534,036

(22) PCT Filed: Oct. 30, 2003

(86) PCT No.: PCT/EP03/12082

§ 371 (c)(1),
(2), (4) Date: May 6, 2005

(87) PCT Pub. No.: WO2004/042460

PCT Pub. Date: May 21, 2004

(65) Prior Publication Data

US 2006/0071878 A1   Apr. 6, 2006

(30) Foreign Application Priority Data

Nov. 7, 2002   (DE) .............................. 102 52 250

(51) Int. Cl.
*G02F 1/03* (2006.01)
(52) U.S. Cl. .................................................... 359/246
(58) Field of Classification Search ................ 359/246, 359/245, 265–275, 295, 321, 322; 345/92, 345/96, 209, 205, 206, 105, 107; 349/144; 435/244, 395, 243
See application file for complete search history.

(56) References Cited

U.S. PATENT DOCUMENTS

| | | | |
|---|---|---|---|
| 4,767,194 A | | 8/1988 | Heppke et al. |
| 4,818,076 A | * | 4/1989 | Heppke et al. .............. 349/167 |
| 6,266,109 B1 | | 7/2001 | Kawata et al. |
| 7,084,849 B2 | * | 8/2006 | Noguchi et al. .............. 345/96 |
| 2004/0150633 A1 | | 8/2004 | Heckmeier et al. |

FOREIGN PATENT DOCUMENTS

| | | |
|---|---|---|
| DE | 3425584 | 1/1986 |
| WO | 02/093244 | 11/2002 |

\* cited by examiner

*Primary Examiner*—Jessica T Stultz
*Assistant Examiner*—Tuyen Q Tra
(74) *Attorney, Agent, or Firm*—Millen, White, Zelano, Branigan, P.C.

(57) ABSTRACT

The invention relates to an electro-optical light control element and to electro-optical displays and display systems, e.g. television screens and computer monitors, which contain elements of this type. The inventive light control elements contain a mesogenic control medium (2) that exists in an optically isotropic phase when the light control elements are in operation. In addition to having a good contrast, a low dependency on viewing angle and very short switching times, the light control elements are particularly characterized by having relatively low drive voltages. The inventive electro-optical light control elements contain a solid dielectric layer (5) between the electrode structure (3, 4) and the mesogenic control layer. The invention also relates to the mesogenic control media, which are used in the electro-optical light control elements and which can exist in a blue phase.

14 Claims, 2 Drawing Sheets

FIG.2

ELECTRO-OPTICAL LIGHT CONTROL ELEMENT AND DISPLAY HAVING A CONTROL MEDIUM WITH AN OPTICALLY ISOTROPIC PHASE

FIELD OF THE INVENTION

The present invention relates to light modulation elements and to displays and display systems containing same. The light modulation elements preferably use modulation media which have anisotropic properties at certain temperatures, such as, for example, liquid crystals. The light modulation elements are operated at a temperature at which the modulation media are in an isotropic phase, preferably in the isotropic phase or in a blue phase, particularly preferably in a blue phase. Displays of this type are described in DE 102 17 273.0 and DE 102 41 301.0 of Apr. 9, 2002 (a further patent application by the applicant of the present application which is hitherto unpublished).

The present invention relates to an electro-optical light modulation element and to electro-optical displays and display systems containing elements of this type, such as television screens, computer monitors and the like. The light modulation elements according to the invention contain a mesogenic modulation medium which is in the isotropic phase during operation of the light modulation elements. Besides good contrast and low viewing-angle dependence of the contrast, they are particularly distinguished by very short response times, in particular for the display of moving pictures, such as, for example, in television or monitor applications, at the same time as a relatively low operating voltage.

In particular, the present invention relates to electro-optical light modulation elements and to electro-optical displays and display systems containing elements of this type which have improved reliability.

OBJECT AND PRIOR ART

Conventional electro-optical liquid-crystal displays are known in general terms. They are operated at a temperature at which the modulation medium is in a mesophase, generally an optically anisotropic mesophase. In most display types, the modulation media are used in the nematic phase. In the mesophase, the modulation media already have anisotropic properties, such as, for example, birefringence ($\Delta n$). These anisotropic properties are not induced just when an electric field is applied. The most widespread are TN ("twisted nematic") and STN ("super twisted nematic") displays. The liquid-crystal cells in these displays have electrodes on the substrates on the two opposite sides of the liquid-crystal medium. The electric field is thus essentially perpendicular to the liquid-crystal layer. The first-mentioned displays in particular are used in combination with TFT ("thin film transistor") addressing for displays having a large information content and high resolution, for example in laptop and notebook computers. Use has recently increasingly been made, in particular in desktop computer monitors, of liquid-crystal displays of the IPS ("in-plane switching", for example DE 40 00 451 and EP 0 588 568) type or alternatively of the VAN ("vertically aligned nematic") type. VAN displays are a variant of the ECB ("electrically controlled birefringence") displays. In a modern variant of the MVA ("multi domain vertically aligned") displays, a plurality of domains are stabilised per addressed electrode, and in addition a special optical compensation layer is used. These displays, like the TN displays already mentioned, use an electric field perpendicular to the liquid-crystal layer. In contrast thereto, IPS displays generally use electrodes on only one substrate, i.e. on one side of the liquid-crystal layer, i.e. are characterised by a significant component of the electric field parallel to the liquid-crystal layer.

A common feature of all these conventional displays is relatively slow switching, which is, in particular, inadequate for the ever more widespread TV and multimedia applications. This is particularly striking in comparison with the virtually ubiquitous cathode-ray tubes. A further disadvantage of the known electro-optical effects employed in liquid-crystal displays is the significant viewing-angle dependence of the contrast achieved. In most cases, this is so great that compensation layers, typically anisotropic films, in some cases with a complex structure, have to be used for displays operated with direct viewing.

Unpublished applications DE 10217273.0 and DE 102 41 301.0 describe light modulation elements in which the mesogenic modulation medium is in the isotropic phase at the operating temperature. These light modulation elements switch particularly quickly and have good viewing-angle dependence of the contrast. However, the reliability of these displays on extended operation is inadequate for some applications. Thus, the electrical conductivity is frequently too great. For driving with a matrix of TFTs, a high voltage holding ratio is necessary. In some of the novel light modulation elements, this can only be achieved through the use of storage capacitors. However, these usually require further process steps in the production of the active substrates and generally result in a reduction in the proportion of the area which is usable for the electro-optical effect. The frequently undesirably high current flow through the light modulation elements results in a low voltage holding ratio and thus in undesired energy consumption. Furthermore, undesired effects occur at the edges and particularly at the corners of the electrode structure. Changes in the contrast occur here which, in particular with increasing operating time, can result in an impairment of the contrast of the light modulation elements. The effects described limit the potential uses of the novel light modulation elements and result in short service lives of the corresponding displays, in particular under loads such as increased temperature or electromagnetic radiation, in particular strong visible light or UV radiation.

A reduction in the concentration of highly polar compounds in the modulation media can result in a reduction in the undesired effects described above. Since the novel electro-optical modulation elements require relatively high driving voltages, which would even increase on restricted use of highly polar compounds, this possibility is generally not particularly advantageous.

The present invention had the object of developing particularly fast-switching light modulation elements having low viewing-angle dependence and in particular having low driving voltages. These light modulation elements should have a layer thickness of the modulation media in the order of a few µm. They are intended to be employed as elements of FPDs (flat panel displays), such as, for example, flat panel screens for computers. The light modulation elements should furthermore be addressable by means of the simplest electrode configuration and have a low operating voltage. In addition, for use in electro-optical displays they should have good contrast with low viewing-angle dependence and in particular their reliability and service life, even under load and in a broad working-temperature range, should be particularly good.

The demand thus exists for improved light modulation elements, in particular having improved reliability.

PRESENT INVENTION

Surprisingly, it has been found that, as described below, light modulation elements which use a mesogenic modulation medium that is in an optically isotropic phase at the operating temperature can be obtained with high reliability.

The electro-optical light modulation elements in accordance with the present invention comprise
a substrate or a plurality of substrates,
an electrode arrangement,
at least one element or a plurality of elements for polarisation of the light and
a modulation medium,
and are characterised in that
the light modulation element is operated at a temperature at which the modulation medium is in an optically isotropic phase in the unaddressed state, and in that
the electrode arrangement can generate an electric field having a significant component parallel to the surface of the mesogenic modulation medium, and in that
the light modulation element includes a solid dielectric layer between the electrode arrangement and the mesogenic modulation layer.

The solid dielectric layer is generally an insulator or a similar layer having a large electrical resistance.

The optically isotropic phase in which the modulation medium is at the operating temperature of the light modulation element can be a true (homogeneous) phase, such as, for example, the isotropic phase of the medium or a blue phase, or alternatively an inhomogeneous, so-called apparent phase, such as, for example, the medium of a PDLC ("polymer dispersed liquid crystal") system having a droplet size which is so small that the system is optically isotropic. Instead of PDLCs, polymer network (PN for short) systems are also possible, in which the liquid crystal is in a continuous phase so long as the characteristic structures are sufficiently small that the system is optically isotropic. To this end, as in the PDLCs, the diameter of the characteristic structures is preferably smaller than the wavelength of the light used.

Preference is given to the use of a modulation medium having a homogeneous phase.

In a preferred embodiment of the present invention, the modulation medium of the light modulation element is in the isotropic phase at the operating temperature or at at least one of the operating temperatures.

In a further preferred embodiment of the present invention, the modulation medium of the light modulation element is in a blue phase at the operating temperature or at at least one of the operating temperatures. In this embodiment, the operating temperature range can extend over the blue phase and beyond or, in the case of the occurrence of a plurality of blue phases, over their range and beyond into the isotropic phase.

Liquid crystals having a correspondingly great chiral twist can have one or more optically isotropic mesophases. These phases appear slightly bluish at a corresponding cholesteric pitch, in a sufficiently large layer thickness. For this reason, they are known as blue phases (Gray and Goodby, "Smectic Liquid Crystals, Textures and Structures", Leonhard Hill, USA, Canada (1984)).

The effects of electric fields on liquid crystals which are in a blue phase are described, for example, in H. S. Kitzerow, "The Effect of Electric Fields on Blue Phases", Mol. Cryst. Liq. Cryst, (1991), Vol. 202, pp. 51-83. The three types of blue phase (BP I to BP III) that have been identified to date which can be observed in field-free liquid crystals are also mentioned therein. However, electro-optical displays which utilise field-induced birefringence are not described. Under the influence of an electric field, further blue phases or other phases which are different from blue phases I, II and III may arise.

An essential aspect of the present invention consists in the presence of the n solid dielectric layer between the electrode arrangement and the mesogenic modulation layer and in its design. The solid dielectric layer between the electrode arrangement and the mesogenic modulation layer of the light modulation elements according to the invention can consist of known solid inorganic or polymeric organic dielectrics. The solid dielectric layer is an electrically insulating layer. Preference is given to layers of $SiO_2$, $SiO_X$, silicon nitride, silicon carbide or the like, very particularly preferably of $SiO_2$ or $SiO_X$.

This solid dielectric layer can be produced by means of known processes, such as, for example, sputtering or vapour deposition.

It may be advantageous here to produce the solid dielectric layer in a joint process step during production of one of the layers of the electrically nonlinear elements of the active matrices, for example of the TFTs. In particular, the uppermost layer of these TFTs or their "topcoat" is possible here. However, it is also possible to use conventional planarisation layers.

The layer thickness of the solid dielectric layer should be sufficiently large in order to achieve the desired effect of passivation, but it should not be selected to be too large in order to avoid lowering the effective voltage for the electro-optical effect excessively. The layer thickness of the solid dielectric layer should preferably be not more than 90% of the thickness of the mesogenic modulation medium. A layer thickness of the dielectric layer in the range from 2 nm to 5 µm, preferably in the range from 10 nm to 1 µm and particularly preferably in the range from 50 nm to 500 nm, has proven particularly favourable.

The solid dielectric layer may extend continuously over the entire surface of the light modulation element. However, it may also in some cases advantageously be structured and extend only over parts of the surface of the light modulation element. The solid dielectric layer covers at least part of the electrode structure, particularly preferably essentially completely covers, in particular, the corners and/or edges of the electrodes, where the changes in contrast, in particular under load, are generally observed first.

In a preferred embodiment of the present invention, the electrode arrangement is designed in such a way that at least one of the four following conditions is satisfied
the adjacent electrically conductive layers in the plane of the modulation layer have a separation of 10 µm or less from one another,
the conductive layer or, if a plurality of electrically conductive layers are present, one of these layers of the electrode structure is raised or a plurality of these layers of the electrode structure are raised,
the electrode structure in each case comprises two or more layers which overlap one another, are connected to one another in an electrically conductive manner and at the same time are separated from one another over significant parts of their surface by a dielectric layer,
the electrically conductive layer or, if a plurality of electrically conductive layers are present, one or more of the conductive layers of the electrode structure is or are separated from the respective underlying substrate by a solid dielectric layer.

Besides the low driving voltage, the good contrast of these displays with particularly low viewing-angle dependence and very short response times, their reliability is excellent.

The present invention is explained in greater detail below.

The modulation medium used in the light modulation element is preferably a mesogenic medium. In the present application, the term mesogenic media denotes media which have a mesophase, which are soluble in a mesophase without narrowing their phase range to a particularly great extent or which induce a mesophase. The mesophase is a smectic phase or a nematic phase, preferably a nematic phase.

The preferred medium used for investigating the mesogenic properties of compounds, components or media which do not themselves have a mesophase is the nematic mixture ZLI-4792 from Merck KGaA, Darmstadt, Germany. The mesogenic compounds, components or media preferably have a clearing point, extrapolated from a 10% solution in this mixture, of $-100°$ C. or above, particularly preferably of $-50°$ C. or above and very particularly preferably of $-20°$ C. or above.

The light modulation elements according to the invention preferably contain a mesogenic medium which is in an optically isotropic phase at the operating temperature. This medium is advantageously located on or below a substrate.

In general, the modulation medium is located between two substrates. This embodiment is preferred. If the modulation medium is located between two substrates, at least one of these substrates is light-transparent. The light-transparent substrate or the light-transparent substrates may, for example, consist of glass, quartz or plastic. If a non-light-transparent substrate is used, this may consist, inter alia, of a metal or a semiconductor. These media can be used as such or can be located on a support, for example a ceramic. If the modulation medium is a polymeric medium, the use of a second substrate can, if desired, be omitted. Polymeric modulation medium can even be produced in self-supporting form. In this case, no substrate at all is necessary.

The operating temperature of the light modulation element is preferably above the transition temperature of the modulation medium into the optically isotropic phase, in general in the range from $0.1°$ to $50°$ above this transition temperature, preferably in the range from $0.1°$ to $10°$ above this transition temperature and particularly preferably in the range from $0.1°$ to $5°$ above this transition temperature.

On application of a voltage, an alignment which results in optical retardation, which can be visualised in a known manner, is induced in the mesogenic medium in the optically isotropic phase. An inhomogeneous electric field is preferably used.

The light modulation elements according to the invention contain at least one element for polarisation of the light. In addition, they preferably contain a further optical element. This further optical element is either a second element for polarisation of the light, a reflector or a transflector.

The optical elements are arranged in such a way that the light, on passing through the mesogenic medium of the light modulation element, passes at least once through at least one polarising element both before entering the mesogenic medium and after exiting from the mesogenic medium.

In a preferred embodiment of the light modulation element in accordance with the present invention, the mesogenic medium is located between two polarisers, i.e. a polariser and an analyser. Two linear polarisers are preferably used. In this embodiment, the absorption axes of the polarisers are preferably crossed and preferably form an angle of essentially $90°$.

The light modulation element according to the invention optionally contains one or more birefringent layers. It preferably contains one $\lambda/4$ layer or a plurality of $\lambda/4$ layers, preferably one $\lambda/4$ layer. The optical retardation of the $\lambda/4$ layer is preferably about 140 nm.

The layer thickness (d) of the mesogenic modulation medium is preferably from $0.1$ μm to $5000$ μm (i.e. 5 mm), particularly preferably from $0.5$ μm to $1000$ μm (i.e. 1 mm), particularly preferably from $1.0$ μm to $100$ μm and very particularly preferably from $3.0$ μm to $30$ μm and in particular from $3.5$ μm to $20$ μm. In a preferred embodiment, the layer thickness of the mesogenic modulation medium is preferably from $0.5$ μm to $50$ μm, particularly preferably from $1.0$ μm to $20$ μm and very particularly preferably from $1.0$ μm to $8.0$ μm.

The present invention also relates to electro-optical displays which contain one or more light modulation elements according to the invention. These electro-optical displays are preferably addressed by means of an active matrix.

The present invention furthermore relates to electro-optical display systems containing one or more electro-optical displays according to the invention. These electro-optical display systems are preferably used for the display of information, inter alia preferably as a television screen or as a computer monitor. The information to be displayed is preferably digital signals or video signals.

The light modulation element according to the invention may additionally contain one or more further conventional optical elements, such as birefringent layers (for example compensation layers), diffuser layers and elements for increasing the brightness and/or the light yield and/or the viewing-angle dependence, this list not being definitive.

The light modulation elements according to the invention are characterised by good contrast, which is highly and virtually predominantly dependent on the properties of the polarisers used. For comparison with conventional TN cells, the TN cells used here have an optical retardation of $0.50$ μm, positive contrast and the absorption axis of the polarisers perpendicular to the preferential alignment of the nematic liquid crystals at the adjacent substrate and contain non-chiral liquid crystals. If the same polarisers are used in the light modulation elements according to the invention and in these conventional TN cells, the contrast of the light modulation elements according to the invention is 40% or more greater than that of the TN cells.

The viewing-angle dependence of the contrast of the light modulation elements according to the invention is very good. It is significantly better than that of the known ECB cells. It is more comparable with the viewing-angle dependence observed in commercially available IPS displays (for example from Hitachi and NEC, both Japan) and MVA displays (for example from Fujitsu, Japan). It is much lower than that of conventional TN displays. Thus, an isocontrast curve for a given contrast ratio in the light modulation elements according to the invention generally includes an angle range which is more than twice as large, often even more than three times as large, as the corresponding isocontrast curve for the same contrast ratio in the TN display.

The response times of the light modulation elements according to the invention are very short. They are generally at values of 5 ms or less, preferably at 1 ms or less, preferably at 0.5 ms or less, particularly preferably at 0.1 ms or less.

It is particularly advantageous that on switching between different grey shades, both the response time for switching off and also, particularly surprisingly, that for switching on are virtually independent of the driving voltage used. This represents a significant advantage over conventional light modulation elements, such as liquid-crystal cells, for example TN cells.

In order to investigate the switching behaviour on addressing of grey shades, the light modulation elements according to the invention were in each case switched with different driving voltages. The end points selected here were characteristic voltages of the electro-optical characteristic line, for example $V_{10}, V_{20}, V_{30}, \ldots$ to $V_{90}$. Then switching was carried out from a given characteristic voltage to the other voltages and back, for example from $V_{10}$ to each of the voltages $V_{90}$, $V_{80}, V_{70}$ to $V_{20}$. Next, another of the characteristic voltages was selected and switching was carried out from this to each of the higher characteristic voltages and back, for example from $V_{20}$ to each of the voltages $V_{90}, V_{80}, V_{70}$ to $V_{30}$, and so on to the starting voltage $V_{80}$ from which switching was carried out to $V_{90}$ and back. In the light modulation elements in accordance with the present invention, the switch-on time from the time of switching-on of the new voltage until 90% of the respective maximum transmission change has been reached is in all these cases, to a first approximation, identical for all these switching operations.

Electro-optical displays in accordance with the present invention contain one or more light modulation elements according to the invention. In a preferred embodiment, these are addressed by means of an active matrix.

In another preferred embodiment, the light modulation elements according to the invention are addressed in so-called "field sequential mode". Here, the switching elements are illuminated successively with light of different colours synchronously with the addressing. In order to produce the pulsed coloured light, a colour wheel, stroboscope lamps or flash lamps, for example, can be employed.

Electro-optical displays in accordance with the present invention may, in particular if they are used for television screens, computer monitors or the like, contain a coloured filter for the display of coloured images. This coloured filter advantageously consists of a mosaic of filter elements of different colours. Typically here, an element of the coloured-filter mosaic of a colour is assigned to each electro-optical switching element.

The light modulation elements according to the invention comprise an electrode structure which generates an electric field having a significant component parallel to the substrate, i.e. also parallel to the layer of the mesogenic medium. In this connection, the area of the modulation medium is taken to mean the area of the principal extension of the modulation medium, which generally corresponds to the display area.

The substrates used may be planar or curved, preferably planar.

The electrode structure may be designed in the form of interdigital electrodes. It may be designed in the form of combs or ladders. Embodiments in the form of superimposed "H"s and double "T"s or "I"s are also advantageous. The electrode structure is advantageously located on only one side of the mesogenic medium, on use of at least one substrate preferably between this and the mesogenic medium. The electrode structure is preferably located in at least two different planes, both located on one side of the mesogenic modulation medium; this applies in particular if the electrode structure contains superjacent sub-structures. These sub-structures are advantageously separated from one another by a dielectric layer. If the sub-structures are located on opposite sides of an insulation layer, a layout can be selected which allows the creation of capacitors. This is particularly advantageous in the case of addressing of displays by means of an active matrix. Active-matrix displays of this type use a matrix of driving elements having a nonlinear current/voltage characteristic line which are assigned to the individual light modulation elements, such as, for example, TFTs or MIM ("metal insulator metal") diodes.

A further aspect of the present invention consists in the design of the electrode structure of the electro-optical switching elements according to the invention. Various embodiments are possible here. The preferred embodiments of the electrodes of the light modulation elements according to the invention are described below, where appropriate with reference to the corresponding figures.

Figure 1:
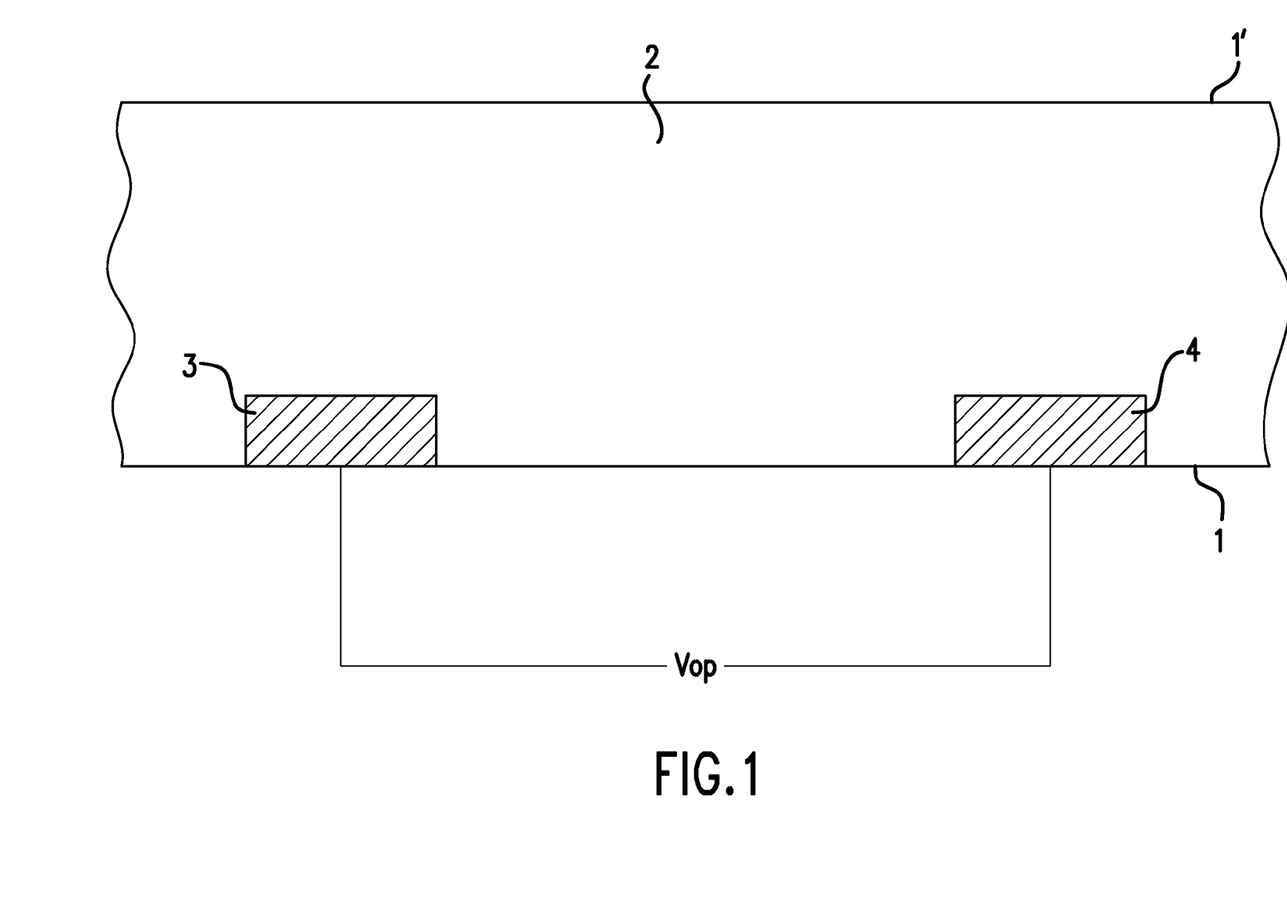
FIG. 1: The figure shows diagrammatically a cross section of the construction of a switching element or part of a switching element with interdigital electrodes. The modulation medium (2) is located between the inner surfaces of the substrates (1) and (1'). The two electrodes (3) and (4) of the electrode structure, to which different potentials can be applied, are located on the inner surface of one substrate (1). Vop denotes the source of the voltage, charge or current. The lines emanating from Vop symbolise the electric supply lines to the electrodes.

The construction of light modulation elements with a mesogenic modulation material is illustrated briefly here with reference to FIG. 1.

The figure shows diagrammatically a cross section of the construction of a switching element of this type or part of a switching element of this type. The modulation medium (2) is located between the inner surfaces of the substrates (1) and (1'). The two electrodes (3) and (4) of the electrode structure, to which different potentials can be applied, are located on the inner surface of one substrate (1). "Vop" denotes the source of the voltage, charge or current. The lines emanating from Vop symbolise the electric supply lines to the electrodes.

The electrodes can consist of transparent material, such as, for example, indium tin oxide (ITO). In this case, it may be advantageous and sometimes necessary to cover part or parts of the light modulation element by means of a black mask. This allows areas in which the electric field is not effective to be masked off and the contrast thus to be improved. However, the electrodes can also consist of non-transparent material, usually of metal, for example of chromium, aluminium, tantalum, copper, silver or gold, preferably of chromium. In this case, the use of a separate black mask may be superfluous.

The electric field used is preferably an inhomogeneous field.

Figure 2:
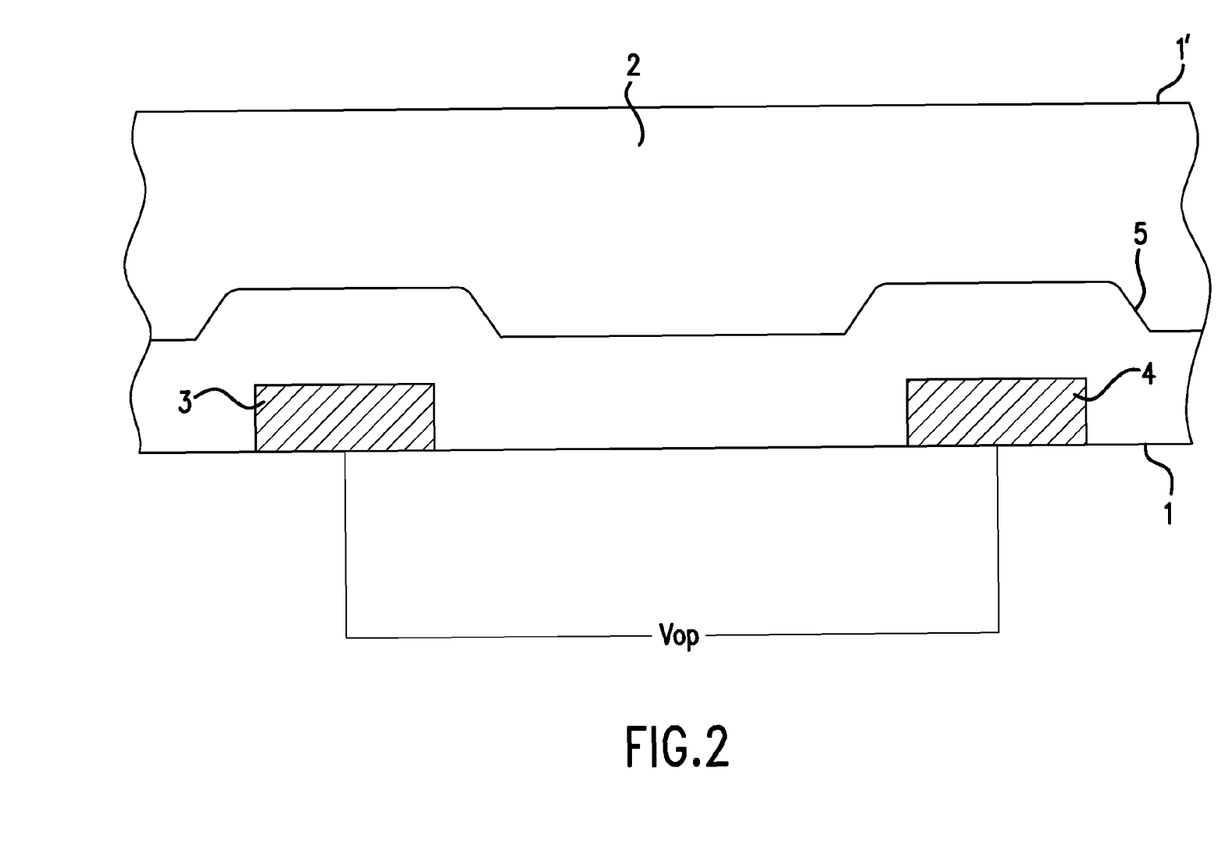

FIG. 2 shows diagrammatically a cross section of the construction of a switching element according to the invention or part of a switching element of this type. The modulation medium (2) is, as in the switching element depicted in FIG. 1, located between the inner surfaces of the substrates (1) (with the two electrodes (3) and (4) of the electrode structure) and (1'). Here, however, the solid dielectric layer (5) are located above the electrodes (3) and (4) on the inner surface of one substrate (1).

The lines emanating from Vop again symbolise the electric supply lines to the electrodes.

In connection with the proportions of the areas of the electrode structure and the solid dielectric layer, the significant part means preferably 20% or more, particularly preferably 30% or more and very particularly preferably 40% or more, the predominant part means preferably 55% or more, particularly preferably 60% or more and very particularly preferably 70% or more, virtually the entire means preferably 80% or more, particularly preferably 90% or more and very particularly preferably 95% or more, and the entire means preferably 98% or more, particularly preferably 99% or more and very particularly preferably 100%.

The mesogenic media in accordance with the present invention preferably have a nematic phase or particularly preferably a chiral nematic phase, i.e. a cholesteric phase. However, it is also possible to use media in which the temperature range of the nematic or cholesteric phase is so narrow that a transition virtually takes place from the crystalline phase or from the or a smectic phase into the optically isotropic phase. This optically isotropic phase may be the isotropic phase directly. However, preference is given to media which initially have a blue phase with increasing temperature.

The clearing point of the mesogenic media having a nematic phase is preferably in the range from −20° C. to 80° C., particularly preferably in the range from 0° C. to 60° C. and very particularly preferably in the range from 20° C. to 60° C. In the case of displays having back-lighting, the clearing point is preferably in the range from 10° C. to 70° C. and particularly preferably in the range from 30° C. to 50° C.

The nematic phase is preferably stable down to −10° C., particularly preferably down to −30° C. and very particularly preferably down to −40° C.

The mesogenic media in accordance with the present invention preferably have a birefringence ($\Delta n$) of 0.080 or more in the nematic phase at a temperature of 4 degrees below the clearing point. The value for the birefringence is as good as unlimited for the application according to the invention. In practical terms, however, it is generally 0.400 or less, preferably 0.300 or less and particularly preferably 0.200 or less. The value for the birefringence of the media according to the invention is measured here in the nematic phase at a temperature of 4° below the clearing point.

If the medium is not nematically stable at this temperature or at least supercoolable down to this temperature in the nematic phase, the birefringence of a mixture comprising 10% of the medium and 90% of the nematic mixture ZLI-4792 from Merck KGaA is determined at 20° C., and extrapolated to the value of the pure medium from the change in the values compared with those of the host mixture. If the solubility of the medium in ZLI-4792 is less than 10%, a 5% solution is exceptionally used. If the solubility of the medium in ZLI-4792 is less than 5%, the nematic mixture MLC-6828 from Merck KGaA is used as host mixture. Here too, the standard concentration is 10%, and a 5% solution is only used if the solubility is inadequate for the preparation of the corresponding mixture.

For the light modulation elements in accordance with the present invention, it is possible to use both mesogenic modulation media which have positive dielectric anisotropy ($\Delta\epsilon$) in the mesophase and those which have negative dielectric anisotropy. Preference is given to the use of mesogenic modulation media which have positive dielectric anisotropy ($\Delta\epsilon$) in the mesophase.

If the mesogenic modulation media have positive dielectric anisotropy, this preferably has a value of 40 or more at 1 kHz and a temperature of 4° below the clearing point; preferably in the nematic phase. If the medium does not have a nematic phase or it is not in the nematic phase at a temperature of 4° below the clearing point, its dielectric anisotropy, as described above in the description of the determination of the birefringence of the media, is determined by extrapolation of the values for a mixture of 10% or 5% in the host mixture ZLI-4792 or MLC-6828.

In the present application, the following applies, unless explicitly stated otherwise.

The dielectric anisotropy $\Delta\epsilon$ of the compounds is determined at 1 kHz and 20° C. by extrapolation of the values for a 10% solution of the respective compound in a host mixture to a proportion of the respective compound of 100%. The capacitances of the test mixtures are determined both in a cell having homeotropic edge alignment and in a cell having homogeneous edge alignment. The layer thickness of the two cell types is about 20 μm. The measurement is carried out using a rectangular wave having a frequency of 1 kHz and an effective voltage (rms, root mean square) of typically from 0.03 V (sometimes also 0.1 V) to 1.0 V. In each case, the voltage used is lower than the capacitive threshold of the mixture investigated in each case.

For dielectrically positive and for dielectrically neutral compounds, the mixture ZLI-4792 or MLC-6828 and for dielectrically negative compounds, the mixture ZLI-3086, both from Merck KGaA, Germany, is used as host mixture, as described above for the modulation media.

The term threshold voltage in the present application means the optical threshold and is indicated for a relative contrast of 10% ($V_{10}$). The mid-grey voltage and the saturation voltage are likewise determined optically and indicated for a relative contrast of 50% and 90% respectively. The capacitive threshold voltage ($V_0$), also known as the Freedericks threshold, indicated, this is stated explicitly.

The indicated ranges of values preferably include the limit values.

The concentrations are given in % by weight and are based on the complete mixture. Temperatures are indicated in degrees Celsius and temperature differences in differential degrees Celsius. All physical properties were determined as in "Merck Liquid Crystals, Physical Properties of Liquid Crystals", Version of November 1997, Merck KGaA, Germany, and are indicated for a temperature of 20° C. The optical anisotropy ($\Delta n$), also known as the birefringence, is determined at a wavelength of 589.3 nm. The dielectric anisotropy ($\Delta\epsilon$) is determined at a frequency of 1 kHz.

In connection with details on the composition of the media or their components,

"comprise" means that the concentration of the respective material mentioned, i.e. of the component or of the compound, in the reference unit, i.e. the medium or the component, is preferably 10% or more, particularly preferably 20% or more and very particularly preferably 30% or more, "consist predominantly of" means that the concentration of the said material in the reference unit is preferably 50% or more, particularly preferably 60% or more and very particularly preferably 70% or more, and "consist virtually completely of" means that the concentration of the said material in the reference unit is preferably 80% or more, particularly preferably 90% or more and very particularly preferably 95% or more.

The enthalpy of clearing is determined by differential scanning calorimetry. The voltage holding ratio is determined using a commercially available VHRM-100 measuring instrument from Autronic Melchers, Germany.

The current flow through the cell is determined using a commercially available LCCS measuring instrument from Autronic Melchers, Germany.

The dielectric properties, electro-optical properties (for example the threshold voltages) and the response times were determined in test cells produced at Merck KGaA, Darmstadt, Germany: The test cells for the determination of $\Delta\epsilon$ had a layer thickness of 22 μm and a circular electrode of indium tin oxide (ITO) having an area of 1.13 cm² and a protective ring. For homeotropic alignment for the determination of $\epsilon_{\parallel}$, cells having a homeotropically aligning polyimide alignment layer were used. Alternatively, lecithin (Merck KGaA) can used as alignment agent. The cells for the determination of $\epsilon_{\perp}$ had alignment layers of the polyimide AL-1054 from Japan Synthetic Rubber, Japan. The capacitances were generally measured using a Solatron 1260 frequency analyser with a rectangular wave and an effective voltage of 0.3 $V_{rms}$. The electro-optical investigations were carried out with white light. The characteristic voltages were determined with perpendicular observation.

The dielectric constant of the media in the optically isotropic phase was determined at a temperature of 4° above the transition temperature into the optically isotropic phase of the particular medium.

The media were introduced into test cells with interdigital electrodes. The layer thickness of the test cells was about 10 μm. The width of the electrodes was 10 μm and the separation between adjacent electrodes was 10 μm. The electro-optical characteristic line was determined at various temperatures above the clearing point of the particular medium. The characteristic value for the characteristic line given in the present application is the value for the voltage ($V_{70}$) at which a relative contrast of 70% is achieved at a temperature of 2° above the clearing point of the particular medium.

In the present application, particularly in the examples described below, the structures of the chemical compounds are indicated by means of abbreviations. The meanings of the respective abbreviations are shown in Tables A and B below. All groups $C_nH_{2n+1}$ and $C_mH_{2m+1}$ are straight-chain alkyl groups having n and m C atoms respectively. Table B is self-evident per se since it indicates in each case the complete abbreviation for a formula of homologous compounds. In Table A, only the abbreviations for the core structures of the compound types are shown. The abbreviations for the respective individual compounds are composed of the respectively pertinent abbreviations of these for the core of the compound and the abbreviation for the groups $R^1$, $R^2$, $L^1$ and $L^2$ attached by means of a dash, as shown in the following table.

| Abbreviation for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO•m | $OC_nH_{2n+1}$ | $C_mH_{2m+1}$ | H | H |
| n | $C_nH_{2n+1}$ | CN | H | H |
| nN•F | $C_nH_{2n+1}$ | CN | H | F |
| nN•F•F | $C_nH_{2n+1}$ | CN | F | F |
| nON•F•F | $OC_nH_{2n+1}$ | CN | F | F |
| nOF | $OC_nH_{2n+1}$ | F | H | H |
| nCl | $C_nH_{2n+1}$ | Cl | H | H |
| nCl•F | $C_nH_{2n+1}$ | Cl | H | F |
| nCl•F•F | $C_nH_{2n+1}$ | Cl | F | F |
| nF | $C_nH_{2n+1}$ | F | H | H |
| nF•F | $C_nH_{2n+1}$ | F | H | F |
| nF•F•F | $C_nH_{2n+1}$ | F | F | F |
| nmF | $C_nH_{2n+1}$ | $C_mH_{2m+1}$ | F | H |
| nCF$_3$ | $C_nH_{2n+1}$ | CF$_3$ | H | H |
| nOCF$_3$ | $C_nH_{2n+1}$ | OCF$_3$ | H | H |
| nOCF$_3$•F | $C_nH_{2n+1}$ | OCF$_3$ | H | F |
| nOCF$_3$•F•F | $C_nH_{2n+1}$ | OCF$_3$ | F | F |
| nOCF$_2$ | $C_nH_{2n+1}$ | OCHF$_2$ | H | H |
| nOCF$_2$•F | $C_nH_{2n+1}$ | OCHF$_2$ | H | F |
| nOCF$_2$•F•F | $C_nH_{2n+1}$ | OCHF$_2$ | F | F |
| nS | $C_nH_{2n+1}$ | NCS | H | H |
| nS•F | $C_nH2_{n+1}$ | NCS | H | F |
| nS•F•F | $C_nH_{2n+1}$ | NCS | F | F |
| rVsN | $C_rH_{2r+1}$—CH=CH—$C_sH_{2s}$— | CN | H | H |
| rOsN | $C_rH_{2r+1}$—O—$C_sH_{2s}$— | CN | H | H |
| nAm | $C_nH_{2n+1}$ | $COOC_mH_{2m+1}$ | H | H |

TABLE A

PYP

PYRP

PPYRP

BCH

CCP

CPTP

CEPTP

TABLE A-continued

TABLE B

TABLE B-continued

TABLE B-continued

CGP-n-X
(X = in particular F, Cl, CN = "N", NCS = "S")

CGG-n-X
(X = in particular F, Cl, CN = "N", NCS = "S")

CGU-n-X
(X = in particular F, Cl, CN = "N", NCS = "S")

PGU-n-X
(X = in particular F, Cl, CN = "N", NCS = "S")

CBC-nm

CBC-nmF

CHE

ECBC-nm

GP-nO-N

TABLE B-continued

TABLE B-continued

BB3·n

PGIP-n-N

PVG-n-S

PVG-nO-S

UPP-n-S

PPTUI-n-m

CPU-n-S

CGU-n-S

TABLE B-continued

TABLE B-continued

GZU-n(O)-N

UZU-n(O)-N

GZU-nA-N

UZU-nA-N

UVZG-n-N

PWZU-3-N

CUZU-n-N

TABLE B-continued

CCZU-n-F

PGU-n-F

UM-n-N

DU-n-N

CC-n-V

CC-n-Vm

The mesogenic media in accordance with the present application preferably comprise
- four or more, preferably six or more, compounds selected from the group consisting of the compounds of Tables A and B and/or
- five or more compounds selected from the group consisting of the compounds of Table B and/or
- two or more compounds selected from the group consisting of the compounds of Table A.

EXAMPLES

The examples described below illustrate the present invention without restricting it in any way. They furthermore indicate to the person skilled in the art the properties and in particular the property combinations that can be achieved by means of the present invention.

Comparative Example

The liquid-crystal mixture having the following composition is prepared and investigated.

| Composition | | |
|---|---|---|
| Compound | Conc./ | |
| # Abbreviation | wt-% | Physical Properties |
| 1 UZU-3A-N | 15.0 | T(N, I) = 22.5° C. |
| 2 UZU-5A-N | 5.6 | T(N, I) − 4° = 18.5° C. |
| 3 GZU-3A-N | 15.0 | $\Delta n(18.5°$ C., 589.3 nm) = 0.0986 |
| 4 GZU-4A-N | 15.0 | T(N, I) + 4° = 26.5° C. |
| 5 GZU-4O-N | 12.0 | $\Sigma_{av.}$(T(N, I) + 4° C., 1 kHz) = 60.8 |

-continued

| | Composition | | |
|---|---|---|---|
| # | Compound Abbreviation | Conc./ wt-% | Physical Properties |
| 6 | CUZU-2-N | 11.0 | $\Delta H(N, I) =$ 572 J/kg |
| 7 | CUZU-3-N | 11.0 | $T_C(N, I)° =$ 23.0° C. |
| 8 | CUZU-4-N | 11.0 | $T_C(N, I) + 2° =$ 25.0° C. |
| 9 | HP-3N•F | 4.4 | $V_{10}(T(N, I) + 2°$ C., 1 kHz) = 33 V |
| Σ | | 100.0 | $V_{70}((N, I) + 2°$ C., 1 kHz) = 48 V |

This liquid-crystal mixture is mixed with 0.1% of the phenol of the formula and introduced into a test cell with interdigital electrodes, without a coating. The clearing point in the cell ($T_C(N,I)$) was 23.0° C. The electro-optical properties of the cell were investigated at a temperature of 2° above this clearing point, i.e. at a temperature of 25.0° C. Its stability is subsequently investigated. To this end, the voltage holding ratio at an ambient temperature of about 20° C. and the current flow through the cell is measured.

The test cell used had interdigital electrodes on only one of the two substrates. An electro-optical test cell with a light switching element containing the liquid-crystal mixture was produced. The substrates consisted of glass. Substrates with no alignment layer and with no passivation layer were used. The electrode structure consisted of comb-shaped electrodes intermeshed with one another. The separation of the electrodes from one another was 10 μm and the width of the electrodes was 10 μm. The layer thickness of the electrodes was about 100 nm. The electrodes were all located in a common plane. The layer thickness of the modulation medium was about 10.0 μm.

A first polariser was used in front of the cell and a second polariser was used as analyser behind the cell. The absorption axes of the two polarisers formed an angle of 90° to one another. The angle between the axis of maximum absorption of the polarisers and the component of the electric field in the plane of the display was 45° in each case. The voltage/transmission characteristic line was determined using a DMS 703 electro-optical measurement station from Autronic-Melchers, Karlsruhe, Germany. The operating temperature was 25.0° C. On perpendicular observation, a curve was obtained as is typical of a cell with electrically controlled birefringence (for example ECB). These results are also shown in the following table (Table 1).

The voltage holding ratio and the current flow through the cell is determined at an ambient temperature of about 20° C.

In each case here, three test cells are investigated and the results obtained are averaged. The results are likewise shown in Table 1.

TABLE 1

Properties of the switching elements

| | Example: | |
|---|---|---|
| | Comparison | 1 |
| Electrode structure | | |
| Separation/μm | 10 | 10 |
| Width/μm | 10 | 10 |
| Passivation layer | no | yes |
| Characteristic line at 25.0° C. | | |
| | Voltage/V | |
| Relative contrast/% | | |
| 0 | 0 | 0 |
| 10 | 33 | 55 |
| 70 | 48 | 98 |
| Electrical properties at 20° C. | | |
| Voltage holding ratio/% | 90.8 | 95.9 |
| (1-Voltage holding ratio)/% | 9.2 | 4.1 |
| Current/μA | 1.61 | 0.30 |

Example

The mixture of the comparative example with 0.1% of the phenol used therein is introduced into a test cell in accordance with the teaching of the present application and, as described in the comparative example, its electro-optical properties are determined at a temperature of 25.0° C. and its voltage holding ratio and power consumption are determined at a temperature of 20° C. The test cell has the same construction and the same electrode structure as that used in the comparative example, but here the electrode structure is covered by an $SiO_2$ layer with a thickness of about 200 nm. This passivation layer covers the entire electrode structure including the electrode interspaces. As in the comparative example, three test cells are investigated in each case and the averages of the results are indicated.

The cell obtained in this way achieved 10% relative contrast at a voltage of 55 V and 70% relative contrast at 98 V.

These results are compared with those of the comparative example in Table 1. As can be seen from this table, the characteristic voltages of the liquid-crystal switching element of Example 1 are increased approximately two-fold compared with those of the comparative example. At the same time, however, the drop in voltage (1-voltage holding ratio) is, however, reduced by more than half and the power consumption to less than one fifth.

DESCRIPTION OF THE FIGURES

FIG. 2 shows diagrammatically a cross section of the construction of a switching element or part of a switching element in accordance with the teaching of the present application. The electrodes have a similar design as in the embodiment shown in FIG. 1. However, the electrodes (3) and (4) are covered by a solid dielectric layer (5). This layer consists of $SiO_2$ and has a thickness of about 200 nm. The electrodes (3) and (4) consist of chromium and have a thickness of about 100 nm. The lines emanating from Vop symbolise, as in FIG. 1, the electric supply lines to the electrodes.

LIST OF THE MEANINGS OF THE REFERENCE SYMBOLS IN THE FIGURES

1: Surface of the first substrate,
1': Surface of the $2^{nd}$ substrate,
2: Modulation layer,
3: Conductive layer of the electrode structure to which the 1st potential can be applied,
4: Conductive layer of the electrode structure to which the 2nd potential can be applied,
5: Solid dielectric layer.
Vop: Source of the voltage, charge or current

The invention claimed is:

1. Electro-optical light modulation element comprising
a substrate or a plurality of substrates,
an electrode arrangement,
at least one element or a plurality of elements for polarisation of the light and
a modulation medium, wherein
the light modulation element is operated at a temperature at which the modulation medium is in optically isotropic phase in the unaddressed state, and the modulation medium is in blue phase at the operating temperature of the light modulation element
the modulation medium has an average dielectric permittivity ($\epsilon_{av}$) of 60.8 or more
the electrode arrangement can generate an electric field having a significant component parallel to the surface of the modulation medium, and in that
the light modulation element includes a solid dielectric layer between the electrode arrangement and a mesogenic modulation layer, and
wherein the optically isotropic phase is a polymer network system.

2. Light modulation element according to claim 1, characterised in that
the solid dielectric layer consists of $SiO_2$, $SiO_x$, silicon nitride or silicon carbide or the like.

3. Light modulation element according to claim 1, characterised in that
the solid dielectric layer covers at least part of the electrode structure.

4. Light modulation element according to claim 3, characterised in that
the solid dielectric layer essentially completely covers the corners and/or edges of the electrode structure.

5. Light modulation element according to claim 3, characterised in that
the solid dielectric layer essentially completely covers the electrode structure.

6. Light modulation element according to claim 3, characterised in that
the solid dielectric layer has a thickness of 90% or less of the layer thickness of the mesogenic modulation layer.

7. Electro-optical display containing one or more light modulation elements according to claim 1.

8. Electro-optical display according to claim 7, characterised in that the display is addressed by means of an active matrix.

9. Electro-optical display system containing one or more electro-optical displays according to claim 7.

10. Electro-optical display system according to claim 9, characterised in that it is used or can be used as a television screen, as a computer monitor or as both.

11. Use of an electro-optical display system according to claim 9 for the display of video signals or digital signals.

12. Use of an electro-optical display according to claim 7 in an electro-optical display system.

13. Use of a light modulation element according to claim 1 for the display of information.

14. Use of a light modulation element according to claim 1 in an electro-optical display.

* * * * *